United States Patent [19]

Kasper et al.

[11] 4,312,937

[45] Jan. 26, 1982

[54] PHOTOGRAPHIC NEGATIVE BASE FOR SELF-DEVELOPING FILM PACKS

[75] Inventors: Klaus B. Kasper; William L. Quartz, both of Pulaski; William H. Myers, Sandy Creek, all of N.Y.

[73] Assignee: Schoeller Technical Papers, Inc., Pulaski, N.Y.

[21] Appl. No.: 139,291

[22] Filed: Apr. 11, 1980

[51] Int. Cl.[3] .......................... G03C 1/86; B32B 27/08

[52] U.S. Cl. .................................... 430/496; 428/219; 428/513; 428/913; 430/215; 430/220; 430/517; 430/527; 430/536; 430/538

[58] Field of Search ............... 430/517, 536, 538, 220, 430/496, 215, 527; 428/511, 913, 513, 219

[56] References Cited

U.S. PATENT DOCUMENTS

| | | | |
|---|---|---|---|
| 3,501,298 | 3/1970 | Crawford | 430/538 |
| 3,525,621 | 8/1970 | Miller | 430/538 |
| 3,676,175 | 7/1972 | Woodward | 430/536 |
| 3,753,764 | 8/1973 | Haefner | 430/231 |
| 3,758,376 | 9/1973 | Beckner | 430/510 |
| 4,145,480 | 3/1979 | Kusama et al. | 428/513 |
| 4,188,220 | 2/1980 | Kasugai | 430/536 |

*Primary Examiner*—George F. Lesmes

*Assistant Examiner*—E. Rollins Buffalow

*Attorney, Agent, or Firm*—Stephen H. Cagle; C. N. Shane, Jr.; Wilson G. Palmer

[57] ABSTRACT

This disclosure relates to production of a photographic film assembly substantially free of optical pinholes for use as a base for negatives in self-developing film packs. The assembly comprises a paper layer and first and second layers of polyolefin adhered to opposite sides of the paper layer. The paper layer has a caliper of about 2 mils to about 4.5 mils and a basis weight of about 55 $g/m^2$ to about 125 $g/m^2$. The first and second polyolefin layers each have a layer weight of about 10 $g/m^2$ to about 48 $g/m^2$. Carbon black is uniformly dispersed in at least two out of the three layers. The total amount of carbon black in the assembly is about 2.5 $g/m^2$ to about 4.0 $g/m^2$.

15 Claims, No Drawings

PHOTOGRAPHIC NEGATIVE BASE FOR SELF-DEVELOPING FILM PACKS

BACKGROUND OF THE INVENTION

This invention relates to opaque photographic papers suitable as a base assembly for the production of negative papers for use in self-developing film packs for diffusion type photographic processes.

In diffusion type photographic processes wherein the photographic print is obtained by pod development, outside of the camera, of the negative in contact with the positive print paper, it is essential that the negative as well as the positive print paper be impervious to actinic light. For purposes of this invention, actinic light is any radiation which causes photochemical action, e.g., visible light. Opaque papers for this use must be substantially free of pinholes.

U.S. Pat. No. 3,411,908 (1968) to Crawford et al. and U.S. Pat. No. 3,753,764 (1973) to Haefner each suggest the use of carbon black in a single backcoating of polyethylene for opacity. U.S. Pat. No. 3,531,514 (1970) to Kerr et al. and U.S. Pat. No. 3,582,339 (1971) to Martens et al. each suggest the use of carbon black as an internal antistat in a backcoating of polyethylene.

We have found that the degree of opacity necessary for use as a negative of a self-developing film pack such as a "Polaroid" pack cannot be obtained with a single extruded carbon black pigmented polyethylene layer. Polaroid is a trademark of Polaroid Corporation, Cambridge, Mass. A single layer of carbon black pigmented polyethylene does not appear to be sufficient due to a very small amount of "grit" which is normally present in the carbon black as commercially manufactured. These grit particles are small clear silicate particles which cause clear unpigmented spots in the polyethylene layer resulting in optical pinholes under actinic light. The optical pinholes appear as a black spot in the negative emulsion after photographic development. A sufficient number of these grit particles are apparently large enough that even at greatly increased coating thicknesses opacity failure due to pinholes cannot be entirely eliminated using only one polyethylene layer containing carbon black.

U.S. Pat. No. 3,615,550 (1971) to Kemme and U.S. Defensive Publication No. T875,014 (Published 1970) to Campbell et al. each disclose that a single layer of polyolefins, e.g., polyethylene, containing carbon black is not sufficient to produce an opaque paper. Each of these disclosures applies an aqueous coating containing carbon black as the principal pigment of a backside coating for opacity. Campbell et al. also adheres a polyolefin layer containing carbon black to the aqueous applied carbon black layer, and Kemme preferably adds carbon black to his polyolefin sealing coat. Campbell et al. apply their aqueous coating directly to the surface of the paper thereby subjecting the paper to swelling during application of the coating and contraction of the paper during drying thereby setting up stresses in the resultant paper. Both Campbell et al. and Kemme require equipment for applying and drying aqueous coatings in addition to extrusion equipment for applying the polyethylene layers.

Commonly-assigned U.S. Pat. No. 3,758,376 (1973) to Beckner et al. discloses the use of light absorbing colorants, e.g., carbon black, in combination with light scattering white pigments in the paper layer to produce a gray opaque paper having a thickness (caliper) of about 7.5 mils. Such a gray opaque paper may be used as a base for positive print papers in pod development in diffusion type photographic processes. The thickness of the paper is desirable to give stiffness and body to the resultant printed picture.

For negative papers, it is desirable to reduce the caliper of the paper layer, and thus the overall caliper of the negative, as much as possible so that the film pack may be kept at a reasonable thickness. At these low calipers which may be as low as 2 mils, loading of these papers with titanium dioxide and carbon black, as taught by Beckner et al., would severely reduce the strength of the paper layer.

We have found that many of the difficulties experienced in the prior art may be eliminated by coating both sides of a layer of paper with a layer of polyolefin. If two out of three of the above layers contain carbon black, a photographic film assembly substantially free of optical pinholes can be produced since alignment of the grit particles in the two layers containing carbon black is practically not possible. Thus, a more efficient use of carbon black can be realized.

STATEMENT OF THE INVENTION

This invention relates to production of a photographic film assembly substantially free of optical pinholes for use as a base for negatives in self-developing film packs. The assembly comprises a paper layer and first and second layers of polyolefin adhered to opposite sides of the paper layer. The paper layer has a caliper of about 2 mils to about 4.5 mils and a basis weight of about 55 $g/m^2$ to about 125 $g/m^2$. The first and second polyolefin layers each have a layer weight of about 10 $g/m^2$ to about 48 $g/m^2$. Carbon black is uniformly dispersed in at least two out of the three layers. The total amount of carbon black in the assembly is about 2.5 $g/m^2$ to about 4.0 $g/m^2$.

DETAILED DESCRIPTION OF THE PREFERRED EMBODIMENT

For purposes of this invention, a paper is defined as being opaque if the paper will not transmit enough light to visibly expose a highly sensitive negative emulsion on exposure to light within a given test time. In the performance of this test, the emulsion side of a high speed negative, such as "Polaroid" 3000 Speed Negative, is covered with the test paper, placed 9 inches from a 375 watt floodlamp and exposed to the light from the lamp for a period of one minute. The thus exposed negative is then kept in the dark until developed and fixed using normal photographic processing procedures. The test paper is said to be completely opaque if the negative is not visibly darkened and black specks, indicating the presence of optical pinholes, are substantially eliminated. The amounts of materials present in the negative base assembly are given in grams per square meter ($g/m^2$).

The opaque negative base papers of this invention consist of a film assembly comprising a photographic paper layer extrusion coated on each side with a layer of polyolefin. Preferably the paper layer is corona treated prior to coating to enhance adhesion of the extended polyolefin layer to the paper. At least two of these three layers contain carbon black as the principal opacifying pigment and may additionally contain a light scattering white pigment, such as titanium dioxide. The carbon black and other pigments which may be present are uniformly dispersed within each layer which contains them. Commercial acceptance of these base papers depends on uniform dispersion of these pigments. The carbon black content of the total film assembly ranges from about 2.5 g/m$^2$ to about 4.0 g/m$^2$ to produce a film assembly substantially free from optical pinholes and thus suitable for use as a negative base. Amounts of carbon black above 4.0 g/m$^2$ may be used but do not appear to contribute additional opacity. Caliper of the film assembly is preferably 5.5 mils. To prevent electrostatic build-up on the resultant negative, an antistat coating as described hereinafter is applied to the backside of the film assembly.

Polyethylene is the preferred polyolefin in this invention. The polyethylene is an extrusion grade and can be low, medium or high density polyethylene. Other polyolefins such as polypropylene can be used if desired.

The polyolefin extrusion coatings generally contain pigments, such as carbon black and/or titanium dioxide.

In order to provide extrusion coatings in which the pigments are uniformly dispersed, it is preferable to prepare the extrusion coatings from masterbatches containing known high concentrations of these pigments. For example, commercially available polyethylene masterbatches containing 35% carbon black and/or 50% titanium dioxide can be blended when heated to molten condition with unpigmented polyethylene to give the desired pigment content for extrusion coating. Such extrusion coatings may contain up to about 15% carbon black, titanium dioxide or a mixture of the two pigments. The preferred amount of carbon black is about 7% of the coating. The titanium dioxide varies from about 3% in the coatings containing carbon black to about 15% when used as the sole pigment.

In a first embodiment of the invention, a gray photographic paper containing both carbon black and titanium dioxide is produced. The gray paper can be produced using the process as disclosed in commonly assigned U.S. Pat. No. 3,758,376 noted supra, the subject matter of which is incorporated herein by reference. The resultant paper layer can range from a caliper of about 2 mils to about 4.5 mils, preferably about 3.5 mils, and the basis weight can be about 55 g/m$^2$ to about 125 g/m$^2$, preferably about 100 g/m$^2$. The carbon black content of the paper is about 0.15 g/m$^2$ to about 2.0 g/m$^2$, preferably about 0.5 g/m$^2$.

The paper is internally sized with a rosin size, stearate size or alkylketene dimer, as desired, to reduce water penetration and then starch surface sized as in the conventional production of photographic papers. The surface size preferably contains an adhesion primer to improve the adhesion of the subsequently applied polyolefin coatings. Adhesion primers, such as aluminum oxide particles, colloidal silicas, hydrolized organic titanates, polyethyleneimines, polyamides and urea formaldehyde may be used. However, a preferred adhesion primer is a maleic anhydride-styrene butadiene copolymer, known in the trade as Scripset. The paper surface may be corona treated to enhance the adhesion of applied extrusion polyethylene coatings. Prior to this corona treatment, supercalendering of the paper layer is desirable to provide a smooth uniform surface over which to apply the polyethylene coatings. A smooth paper surface is desirable in the production of a satisfactory negative base.

A backside polyethylene layer is applied to the paper layer by extrusion coating. Weight of the extruded polyethylene layer is from about 10 g/m$^2$ to about 48 g/m$^2$, preferably about 30 g/m$^2$, and the polyethylene layer contains from about 0.7 g/m$^2$ to about 3.0 g/m$^2$, preferably 2.0 g/m$^2$ of carbon black. The layer of polyethylene may optionally contain titanium dioxide in amounts preferably about 50% of the carbon black present.

The frontside is extrusion coated with a polyethylene layer having a layer weight of from about 10 g/m$^2$ to about 48 g/m$^2$, preferably about 30 g/m$^2$. The frontside polyethylene coating contains about 1 g/m$^2$ to about 7.2 g/m$^2$, preferably about 4.5 g/m$^2$, of titanium dioxide.

The backside coated polyethylene is preferably corona treated and then coated with an aqueous antistat coating containing an antistat and a binder in a ratio of about 1 to 2, antistat to binder. Known antistats may be used. Carbon black is preferred since it is not humidity dependent and thus works well at all humidity conditions. The binder is preferably an acrylic latex, but may be any of a number of known water soluble or dispersible binders, for example polyvinyl alcohol or an styrene-butadiene latex. The total antistat coating is about 1 g/m$^2$. The amount of antistat is selected to give a maximum surface resistivity of $10^8$ ohms, preferably $10^5$ to $10^6$ ohms, at 70° F. and 20% relative humidity.

The frontside polyolefin coating is optionally corona surface treated and then optionally coated with a gelatin subcoating having a coat weight of, preferably, about 0.5 g/m$^2$. The function of the gelatin subcoating is to enhance the adhesion to the film assembly of subsequently applied photographic emulsions for either black and white or color reproduction.

A negative base prepared as in this embodiment of the invention can be used as a base for either black and white negatives or color negatives.

In a second embodiment of this invention a smooth white photographic paper of about 2 mils to about 4.5 mils, preferably 3.5 mils, and having a basis weight of about 55 g/m$^2$ to about 125 g/m$^2$, preferably about 100 g/m$^2$, is preferably corona treated on the backside and is then backcoated with a first layer of polyethylene containing carbon black. The weight of the extruded polyethylene layer is from about 10 g/m$^2$ to about 48 g/m$^2$, preferably about 20 g/m$^2$, and the polyethylene layer contains about 0.7 g/m$^2$ to about 3.0 g/m$^2$, preferably about 1.4 g/m$^2$ of carbon black. The layer of polyethylene may optionally contain titanium dioxide in amounts preferably about 50% of the carbon black present.

A second polyethylene layer which may be a duplicate of the first layer of polyethylene in this embodiment is applied to the front side of the white photographic paper in the same manner and within same weight ranges as the first layer of polyethylene.

An antistat coating is preferably applied to the backside polyethylene coating as in the first embodiment and optionally a gelatin subcoating having a coat weight of preferably 0.5 g/m$^2$ may be applied to the front side polyethylene coating. Prior to application of the antistat or gelatin subcoating the front side and backside polyethylene layers may be corona treated to facilitate adhesion of these coatings to the polyethylene layers.

A negative base prepared as in this embodiment of the invention can be used as a base for color negatives.

A preferred embodiment is described in greater detail herein below by reference to the following example. This example is for illustration only and is not intended to be limiting to the product of this invention. Unless otherwise noted the parts, percent and the like are by weight.

EXAMPLE

A gray, photographic base paper was produced by adding an aqueous dispersion of anatase titanium dioxide to a suspension of photographic grade sulfite and kraftwood fibers which have been previously refined to a Canadian Freeness of about 350. The addition rate of the titanium dioxide was such as to result in an ash content of 10–14% of the finished paper. As a light absorbing pigment an aqueous suspension of Aqua Black 100(carbon black) was added to the slurry at a rate to result in a carbon black content of the finished paper of 0.3 to 0.4%. Prior to formation of the gray paper on a four-drinier machine, about 2% cationic starch and about 1% stearate size, both based on the fiber content and aluminum chloride to a pH of about 4.5 were added to this combined pulp suspension. The paper was formed using papermaking techniques known to produce a well formed paper. It was dried and pressed in the usual manner. The paper was surface sized with 6% oxidized starch in a first size press, followed by a second size press application of 1.5% Scripset (a maleic anhydride-styrene butadiene copolymer). The paper was machine calendered to provide a smooth paper for further coating.

The finished paper had a basis weight of 93 $g/m^2$ and a caliper of 3.3 mils and was light gray in color. The gray paper was then extrusion coated on one side with 30 $g/m^2$ of high density polyethylene containing 7% carbon black and 3% titanium dioxide. The paper surface was corona treated just prior to extrusion coating to improve polyethylene to paper adhesion. The other side of the paper was extrusion coated with 26 $g/m^2$ of low density polyethylene containing 15% titanium dioxide. The black polyethylene surface was then overcoated with an aqueous antistatic coating solution consisting of an acrylic latex as a binder Aqua Black 15 a highly conductive carbon black pigment and an acrylic latex binder in a ratio of 1:2.1 parts pigment to binder based on solids content. The coating was dried leaving a dry coating weight of about 1 $g/m^2$ having a surface resistivity of less than $10^8$ ohms. The polyethylene surface was corona treated prior to the application of the aqueous antistatic coating to facilitate the adhesion of this coating to the polyethylene surface. The white polyethylene surface on the other side was subcoated with an aqueous solution of about 3% photographic grade gelatin containing surfactants and gelatin hardeners, i.e., chrome alum. The polyethylene surface was corona treated prior to the application of the gelatin coating solution and the coating weight of the gelatin coating after drying was 0.3 to 0.5 $g/m^2$.

The gray paper which had been extrusion backcoated with both titanium dioxide and carbon black was tested for opacity using the definitive test procedure noted supra. The paper was opaque. No pinholes were observed.

The finished negative base paper was coated on the gelatin subcoating with a silver halide emulsion. The silver halide emulsion coated paper functioned well as a black and white negative. Adhesion of the silver halide emulsion to the base was excellent.

What is claimed is:

1. A low caliper photographic film assembly substantially free of optical pinholes suitable for use as a base for negatives in self-developing photographic film packs, said assembly comprising:

(a) a layer of paper, said paper layer being characterized by:
  (i) a caliper of from about 2.0 mils to about 4.5 mils, and
  (ii) a basis weight of from about 55 $g/m^2$ to about 125 $g/m^2$;

(b) a first layer of polyolefin extrusion coated on a first surface of said paper layer, said first polyolefin layer being characterized by a total weight of from about 10 $g/m^2$ to about 48 $g/m^2$;

(c) a second layer of polyolefin extrusion coated on a second surface of said paper layer, said second polyolefin layer being characterized by a total weight of from about 10 $g/m^2$ to about 48 $g/m^2$;

said film assembly containing from about 2.5 $g/m^2$ to about 4.0 $g/m^2$ of carbon black, said carbon black being substantially uniformly dispersed in at least two of said layers of said film assembly.

2. The photographic film assembly of claim 1 wherein the polyolefin is polyethylene.

3. The photographic film assembly of claim 2 wherein an antistatic layer has been applied to said first layer of polyethylene, said antistatic layer having a maximum surface resistivity of $10^8$ ohms at 70° F. and 20% relative humidity.

4. The photographic film assembly of claim 3 wherein said carbon black is present in said first and second layers of polyethylene.

5. The photographic film assembly of claim 3 wherein said carbon black is present in said paper layer and said first layer of polyethylene.

6. The photographic film assembly of claim 5 wherein titanium dioxide pigment is present in said second layer of polyethylene in an amount sufficient to mask said carbon black in said gray paper.

7. The photographic film assembly of claim 3 wherein the caliper of said assembly is about 5.5 mils.

8. The photographic film assembly of claim 4 wherein a gelatin subcoating is applied to said second layer of polyethylene.

9. The photographic film assembly of claim 6 wherein a gelatin subcoating is applied to said second layer of polyethylene.

10. A low caliper photographic film assembly substantially free of optical pinholes suitable for use as a base for negatives in self-developing film packs, said assembly comprising:

(a) a layer of paper, said paper layer being characterized by:
  (i) a caliper from about 2.0 to 4.5 mils,
  (ii) a basis weight from about 55 $g/m^2$ to about 125 $g/m^2$,
  (iii) containing from about 0.15 $g/m^2$ to about 2.0 $g/m^2$ of carbon black, (b) a first layer of polyethylene extrusion coated on a first surface of said paper layer, said first polyethylene layer being characterized by a total weight of from about 10 $g/m^2$ to about 48 $g/m^2$ and containing from about 0.7 $g/m^2$ to about 3.0 $g/m^2$ of carbon black, (c) a second layer of polyethylene extrusion coated on a second surface of said paper layer, said second polyethylene being characterized by a weight of from about 10 $g/m^2$ to about 48 $g/m^2$ and containing from about 1 $g/m^2$ to about 7.2 $g/m^2$ of titanium dioxide, (d) an antistatic layer adhered to said first layer of polyolefin, said antistatic layer having a maximum surface resistivity of $10^8$ ohms at 70° F. and 20% relative humidity, said film assembly containing a maximum carbon black content of about 4.0 g/m$^2$.

11. The photographic assembly of claim 10 wherein said first layer of polyolefin further contains up to about 1.5 g/m$^2$ of titanium dioxide.

12. The photographic film assembly of claim 10 or 11 wherein a gelatin subcoating is applied to said second layer of polyethylene.

13. A low caliper photographic film assembly substantially free of optical pinholes suitable for use as a base for negatives in self-developing film packs, said assembly comprising:

(a) a layer of paper being characterized by:
  (i) a caliper from about 2.0 mils to about 4.5 mils;
  (ii) a basis weight from about 55 g/m$^2$ to about 125 g/m$^2$, (b) a first layer of polyethylene extrusion coated on a first surface of said paper layer, said first layer of polyethylene being characterized by a total weight of from about 10 g/m to about 48 g/m$^2$ and containing from about 0.7 g/m$^2$ to about 3.0 g/m$^2$ of carbon black, (c) a second layer of polyethylene extrusion coated on a second surface of said paper layer, said second polyethylene layer being characterized by a total weight of from about 10 g/m$^2$ to about 48 g/m$^2$ and containing from about 0.7 g/m$^2$ to about 3.0 g/m$^2$ of carbon black, (d) an antistatic layer adhered to said first layer of polyolefin, said antistatic layer having a maximum surface resistivity of $10^8$ ohms at 70° F. and 20% relative humidity.

said film assembly containing a maximum carbon black content of about 4.0 g/m$^2$.

14. The photographic film assembly of claim 13 wherein each of said layers of polyethylene further contains up to about 1.5 g/m$^2$ of titanium dioxide.

15. The photographic film assembly of claim 13 or 14 wherein a gelatin subcoating is applied to said second layer of polyethylene.

* * * * *